United States Patent [19]
Gordonov et al.

[11] Patent Number: 5,560,768
[45] Date of Patent: Oct. 1, 1996

[54] METHOD FOR PREPARING AN ENCAPSULATED SLOW-RELEASE PARTICULATE FERTILIZER

[75] Inventors: Boris Gordonov, Nesher; Abraham Shaviv, Haifa; Evgeny Zlotnikov, Nesher; Uri Michael, Natanya, all of Israel

[73] Assignee: Haifa Chemicals South Ltd., Haifa, Israel

[21] Appl. No.: 197,722

[22] Filed: Feb. 17, 1994

[30] Foreign Application Priority Data

| May 6, 1993 | [IL] | Israel | ......................... 105617 |
| Dec. 8, 1993 | [IL] | Israel | ......................... 107939 |

[51] Int. Cl.⁶ .............................. B05D 1/24; B05D 3/02; C05G 5/00
[52] U.S. Cl. ................ 71/64.07; 71/64.11; 427/185; 427/189; 427/213; 427/214; 427/375
[58] Field of Search ................ 71/64.07, 64.11; 427/185, 189, 213, 213.3, 213.31, 375

[56] References Cited

U.S. PATENT DOCUMENTS

| Re. 27,238 | 11/1971 | Stansbury et al. ............... 71/27 |
| 3,158,462 | 11/1964 | Wilson ........................... 71/4 |
| 3,223,518 | 12/1965 | Hansen .......................... 71/64 |
| 3,259,482 | 7/1966 | Hansen .......................... 71/64 |
| 3,264,089 | 8/1966 | Hansen .......................... 71/64 |
| 3,295,950 | 1/1967 | Blouin et al. .................... 71/64 |
| 3,306,730 | 2/1967 | Malmberg et al. ............ 71/64.07 |
| 3,539,326 | 11/1970 | Otsuka et al. ................... 71/28 |
| 3,576,613 | 4/1971 | Fleming ......................... 71/28 |
| 3,598,563 | 8/1971 | Burch ........................... 71/25 |
| 3,872,040 | 3/1975 | Mollohan et al. ............ 427/375 X |
| 4,042,366 | 8/1977 | Fersch et al. ................... 71/29 |
| 4,071,304 | 1/1978 | Chauvin et al. ................ 427/185 |
| 4,081,264 | 3/1978 | Ali .............................. 71/28 |
| 4,369,055 | 1/1983 | Fujita et al. ................. 71/64.11 |
| 4,455,161 | 6/1984 | Cohen et al. .................... 71/24 |
| 4,469,502 | 9/1984 | Heller et al. .................... 71/11 |
| 4,565,564 | 1/1986 | Backlund ........................ 71/28 |
| 4,594,380 | 6/1986 | Chapin et al. ................. 524/144 |
| 4,636,242 | 1/1987 | Timmons ........................ 71/28 |
| 4,657,576 | 4/1987 | Lambie ...................... 71/64.07 |
| 4,711,659 | 12/1987 | Moore ........................... 71/93 |
| 4,772,490 | 9/1988 | Kogler et al. ................. 427/212 |
| 4,804,403 | 2/1989 | Moore ........................... 71/28 |
| 4,851,027 | 6/1989 | Murayama et al. ........... 71/64.07 |
| 4,857,098 | 8/1989 | Shirley, Jr. ..................... 71/28 |
| 4,936,897 | 6/1990 | Pipko et al. ................. 71/64.05 |
| 4,969,947 | 11/1990 | Moore ........................... 71/28 |
| 5,264,019 | 11/1993 | Gossett, Jr. et al. .......... 71/64.07 |

FOREIGN PATENT DOCUMENTS

| 0184869 | 6/1986 | European Pat. Off. . |
| 0276179 | 7/1988 | European Pat. Off. . |
| 954555 | 4/1964 | United Kingdom . |
| 1025126 | 4/1966 | United Kingdom . |
| 8801132 | 2/1988 | WIPO . |
| 9110362 | 7/1991 | WIPO . |

OTHER PUBLICATIONS

C. B. Christianson, "Factors Affecting N Release of Urea From Reactive Layer coated Urea", Fertilizer Research 16; 273–284 (1988).

*Primary Examiner*—Richard D. Lovering
*Attorney, Agent, or Firm*—Steinberg, Raskin & Davidson, P.C.

[57] ABSTRACT

Preparation of an encapsulated slow-release particulate fertilizer. A particulate fertilizer starting material is pretreated for increasing its capacity of holding powderous material by adhesion. The resulting first intermediary product is coated with a powderous waterproofing material which fuses below the phase transition temperature of the fertilizer. A second intermediary product obtained in this way is heated to a temperature below the phase transition temperature to fuse the waterproofing material.

22 Claims, 3 Drawing Sheets

METHOD FOR PREPARING AN ENCAPSULATED SLOW-RELEASE PARTICULATE FERTILIZER

FIELD OF THE INVENTION

The present invention relates to an improved method for the preparation of particulate slow-release chemical fertilizer products of the kind in which the fertilizer material in each particle is physically protected by a water-proofing composition. The term "chemical fertilizer" or "fertilizer" for short as used herein denotes an at least moderately water-soluble chemical substance or mixture of such substances, and the term "particulate fertilizer" used herein denotes any type of comminuted fertilizer such as granulated, pelleted, or microgranulated and the like.

BACKGROUND OF THE INVENTION

Chemical fertilizers are, as a rule, not fully utilized by the crop with much of the fertilizer material being lost to the soil environment and to the atmosphere. This occurrence is encountered practically with all fertilizers and is particularly pronounced with nitrogen-based fertilizers. The main reason for this deficiency is the very water-solubility of the fertilizer as a result of which undesired dissipation of the fertilizer by drainage and losses to the atmosphere in the form of $NH_3$, $N_2O$, $NO$ or $NO_2$, compete with the root uptake thereof.

It has been suggested to overcome this problem by means of chemically prepared, slow-release fertilizers such as, for example, ureaform, isobutylidene diurea, oxamide and others, in which the fertilizer is present in form of a compound of reduced water-solubility. This method, however, has, among others, the disadvantage that it requires expensive raw materials and involves high manufacturing costs with the result that the price of the product may be prohibitive. Thus, for instance, in case of nitrogen-based fertilizers, the use of nitrogen compounds of reduced water solubility is at least three times as costly as the use of regular, water-soluble nitrogen fertilizers. Moreover, due to the so-called tailing effect, i.e. too slow decomposition, upon application to the soil, the efficiencies of chemically prepared fertilizers of reduced water solubility is often still unsatisfactory.

It is also known to control the dissolution rate of fertilizers by means of a physical barrier provided by coating of individual fertilizer particles with a composition of restricted water permeability or encapsulation of a cluster of fertilizer particles in matrices of such compositions, which composition will be referred to herein at times as "waterproofing material", and this type of slow-release fertilizer composition is capturing a steadily increasing market share. In the following, the terms "encapsulation" and "encapsulated" will be used in relation to slow-release particulate fertilizers of this kind, regardless of whether each particle of a particulate fertilizer is coated individually or whether clusters of such particles are encapsulated within matrices.

Encapsulated slow-release fertilizers may be classified into two major groups according to the fertilizer release mechanism:

(i) A first group in which the release is governed by the rate of water permeation through a polymeric or copolymeric membrane of the water-proofing material, and by the rate of fertilizer diffusion away from each coated particle into the surrounding soil. Typical examples of membrane material in slow-release fertilizers of this group are copolymers or glyceryl esters of unsaturated acids with dicyclopentadiene (U.S. Pat. No. 3,223,518), epoxy-polyester resins (U.S. Pat. No. 3,259,482), urethanes (U.S. Pat. No. 3,264,089) and polystyrenes (U.S. Pat. No. 3,158,462). The encapsulating polymer in slow-release fertilizers of this first group are generally applied either by spraying solutions of polymers dissolved in organic solvents as disclosed, for example, in U.S. Pat. No. 4,369,055, or by in situ polymerization which is brought about by the simultaneous spraying of several liquids onto the surface of the fertilizer particles as disclosed, for example, in U.S. Pat. Nos. 4,711,659 and 4,804,403. Either of these processes is, as a rule, carried out batchwise and generally large amounts of organic solvents are required which have to be recycled for economical reasons and also in order to avoid environmental pollution.

(ii) A second group with relatively thick encapsulating coats in which release is governed mainly by rupture of the coat, a typical example being particulate fertilizers with sulfur based encapsulation. The rupture occurs upon the permeation of water into the coated particles as a result of the osmotic pressure that builds up within. The sulfur based coating in slow-release fertilizers of this second group are generally produced by spraying onto the particulate fertilizer a molten sulfur based material as disclosed, for example, in U.S. Pat. No. 4,857,098. One major disadvantage of conventionally produced slow-release fertilizers with sulfur or sulfur based encapsulation is that very often the encapsulating coat is non-uniform, with the result that a significant amount of the fertilizer may be released within an unduly short period (so-called burst effect) due to the fact that the overlying coat is too thin, while the remainder of the fertilizer is retained within the encapsulated particles for an exceedingly long period due to excessive thickness of the overlying coat (so-called tailing or lock-off effect).

Further disadvantages of sulfur and sulfur based encapsulation produced by melt spraying are inefficient wetting of the fertilizer particles and bad adhesion and fragility of the encapsulating coat, all of which leads to peeling off of the coat from the fertilizer particles during transportation and handling.

Some improvement of sulfur based encapsulation may be achieved by applying to the encapsulating coat a further, external coating of wax, bitumen, synthetic resin and the like, followed, if desired, by spreading an inert powder on the wet external coating to reduce stickiness.

Quite generally, for successful performance of a melt spray, the coating material should possess a definite melting point, should have a low viscosity in the molten state, should solidify rapidly after application and yield a non-sticky encapsulating coat with good wetting and adhesion properties.

There are many amorphous materials, which, while capable of forming a good waterproofing film suitable to yield particulate fertilizer with slow-release properties, do not possess some of the above properties so that the production of slow-release fertilizers with such waterproofing materials is problematic.

AU 601,099 and AU Patent Application 89/29533 disclose a method for the production of particulate fertilizer which comprises wetting fertilizer particles with 1–5% by weight of water or an aqueous salt solution to serve as binder, followed by coating the so-wetted particles with a sulfur and/or a micronutrient powder. The final particulate product has no slow-release properties and the object of the powderous sulfur and/or micronutrient coating is merely to provide a readily disintegrating coat which upon application to the soil delivers finely divided sulfur and micronutrient particles, with the elementary sulfur being oxidized in the soil.

It is also known to apply mineral powder to a particulate fertilizer prior to the application of a waterproofing sulfur coating by way of a melt spray, and such a procedure is described, for example, in U.S. Pat. No. 3,576,613. According to this teaching, the fine powder particles adhere to the fertilizer and thereby facilitate subsequent even distribution of the sulfur melt on the entire granule surfaces.

It is further known in the art of drug coating (see, for example, "Controlled Release Systems: Fabrication Technology", edited by Dean S. T. Hsieh, v.1, CRC Press, Inc., Boca Raton, Fla., 1988, pp 109–142) that micro-capsules of soluble compounds with controlled release properties can be produced by a mechanochemical encapsulation process comprising blending the soluble compound to be protected in coarse particulate form, with a fine powderous waterproofing material. In this way, a powder layer is formed on the surface of each of the coarse soluble particles due to adhesion forces, e.g. of an electrostatic nature. After blending, the powder layers on the surfaces of the particles are filmed by prolonged mechanical agitation, preferably with heating. The coating obtained in this way is based on adhesion only and its thickness, uniformity and resistance to osmotic pressure are insufficient for making an encapsulated particulate fertilizer product with the desired long-term and constant release properties.

For the production of an encapsulated particulate fertilizer with good slow-release properties, it is essential that a uniform and coherent shell of waterproofing material adheres well to the fertilizer particles and it is the object of the present invention to provide a method for the production of encapsulated slow-release particulate fertilizer with good sustained and essentially constant release properties.

It is a further object of the present invention to provide an environmentally friendly method for the production of encapsulated slow-release particulate fertilizer products, which in its essential part does not require the use of organic solvents.

BRIEF DESCRIPTION OF THE INVENTION

In accordance with the present invention there is provided a method of preparing an encapsulated slow-release particulate fertilizer by encapsulation of a particulate fertilizer starting material in a coherent shell of a waterproofing material comprising:

subjecting the particulate fertilizer starting material to a pretreatment to enhance its capacity of holding powderous material by adhesion, to yield a first intermediary product;

coating said first intermediary product with a powderous waterproofing material of a kind that fuses at a temperature below the phase transition temperature of the fertilizer to yield a second intermediary product in which the fertilizer particles bear a coat of powderous waterproofing material;

heating said second intermediary product to a temperature below the phase transition temperature of the fertilizer, at which the waterproofing material fuses and then allowing the particulate fertilizer to cool;

whereby a final slow release encapsulated particulate fertilizer product is obtained in which the fertilizer particles are encapsulated within a coherent shell of waterproofing material.

The phase transition temperature of the fertilizer is the temperature at which the fertilizer melts or decomposes.

The powderous waterproofing material used for coating the first intermediary product may be ready made or prepared in situ by milling a waterproofing raw material which may be in the form of blocks, rods, pellets, sheets and the like.

It has been found that in encapsulated slow-release particulate fertilizers prepared by the method according to the present invention, the waterproofing coherent shell adheres strongly to the particulate fertilizer substrate. This strong adhesion results in the first place from the in situ fusion of the powderous waterproofing coat, and is enhanced by the penetration of the fused waterproofing material into cracks in the fertilizer substrate. As a result, the waterproofing encapsulating shell does not crack nor peel off during handling, transportation and storage.

It is to be noted that the method according to the invention does not require the use of any organic solvents, which in addition to rendering the method economically attractive, also makes it environmentally friendly, both of which aspects are of great significance.

The method according to the invention can be employed successfully for making encapsulated particulate slow-release fertilizer of the first and second groups as defined herein, employing any known kind of waterproofing material provided its fusion temperature is below the phase transition temperature of the fertilizer, and further provided that it is solid at the expected storage temperature. In encapsulated slow-release particulate fertilizers of the first group made in accordance with the invention, the waterproofing material should furthermore be capable of resisting in the solid state the internal osmotic pressure building up within the encapsulated fertilizer particle as a result of the penetration of water therein.

In accordance with one embodiment of the method according to the invention, the pretreatment of the particulate fertilizer starting material is by way of wetting or precoating with a suitable liquid which is selected in accordance with the nature of the waterproofing material. For example, where the waterproofing material is a solid wax or a sulfur based organic composition, various hydrophobic oils such as crude tall oil, tall oil distillation products and tall oil pitch; linseed oil; soybean oil; engine oil; soft wax; and many others may be used.

In accordance with another embodiment of the method according to the invention, the pretreatment of the particulate fertilizer starting material is by way of heating it to above the fusion temperature of the waterproofing material.

In accordance with yet another embodiment of the method according to the invention, the pretreatment of the particulate fertilizer starting material is by way of heating it up to partial or complete melting, followed by dispersion of the resulting melt or melt/crystal suspension into droplets.

In the embodiment by which the pretreatment consists in wetting or precoating the fertilizer particles with liquid, such liquid will in addition to adhering to the surface, as a rule also penetrate into the cracks and cavities of the fertilizer particles. Where the liquid is of a hydrophobic nature, it will, in addition to enhancing the adhesion of the powderous waterproofing material also serve in itself as an internal barrier, contributing to the control of water permeation into the granules and of aqueous fertilizer solution delivery therefrom. If desired, it is possible in accordance with this embodiment, to employ for the pretreatment of the starting material a liquid capable of dissolving the waterproofing material used for coating. In such a case, when the said second intermediary product is heated in order to fuse the powderous waterproofing material, the latter, while fusing also dissolves in the liquid used for pretreatment which results in the formation of a continuous phase which solidifies upon cooling, and in this way both the waterproofing and physical properties of the encapsulating coat and its adhesion to the substrate may be further improved.

Also if desired, the wetted or precoated particulate fertilizers that constitutes the first intermediary product where pretreatment is effected with a liquid, may be heated prior to the application of the powderous waterproofing material, and this may be particularly desirable in cases where a viscous liquid is used for the pretreatment. If the temperature to which the precoated material is heated is higher than the sintering temperature of the powderous waterproofing material, powder sintering and agglomeration on the surface of the heated particulate fertilizer substrate begins to play a noticeable role in the buildup of the powder coat in the second intermediary product. However, heating of the first intermediary product to a temperature above the fusion temperature of the waterproofing material should be avoided, since this may lead to an agglomeration of the fertilizer particles in the second intermediary product, which is undesirable.

Where in the above embodiment operation is batchwise, the same equipment may be used both for wetting or precoating and for the subsequent powder coating.

In the performance of the embodiment by which pretreatment of the particulate fertilizer starting material consists in heating the starting material to a temperature above the fusing point of the powderous water proofing material, the heat treatment may be performed in any suitable conventional equipment such as a fluidized bed device, a rotating drum, a pneumotransport system, etc.

In the embodiment by which the pretreatment operation consists in heating up the starting material to partial or complete melting followed by dispersing the resulting melt or melt/crystal suspension into droplets, the droplets may by one variant be directly fed into an agitated bed, e.g. a vibrofluidized bed of the coating powder where solidification takes place, possibly together with partial fusion of the powder on the droplets' surface.

By a different variant, instead of feeding the droplets of the molten fertilizer material directly into a bed of the coating material, they are first subjected to prilling by solidification in a liquid and the solidified particles are separated from excess prilling liquid. In the performance of this variant a prilling liquid must be selected that does not dissolve the fertilizer, preferably the prilling liquid is a hydrophobic oil, e.g. a hydrophobic plant oil such as soybean oil. It has been found that prilling in a liquid coolant provides for enhanced adsorption and adhesion of the powderous waterproofing material in the following operational step.

For coating the first intermediary product with the powderous waterproofing material, the mixture may be agitated, e.g. by employing a vibrating bed. Vibration of a bed containing a mixture of powderous waterproofing material and the particulate first intermediary product causes an intensive mixing of the components and a uniform spread of the powder on the particle surfaces and prevents any agglomeration. For example, circular vibration with a frequency of 1,000–2,200 rotations per minute imposed on such a mixed bed in a vertical cylindrical vessel, was found to be effective. Good results have also been obtained with a rotating pan having an internal lift.

It has been found in accordance with the present invention that for powder coating an excess of the powderous material is preferably used, the powder particles which do not stick to the fertilizer particles serving as spacers separating the fertilizer particle from each other so as to prevent their agglomeration. Also, an excess of powder enables the fertilizer particles to receive a uniform coat within a very short time, generally within the range of from 3 seconds to 3 minutes. Upon completion of the formation of powder coats on the particles of the first intermediary product, the excess powder is separated from the resulting second intermediary product by any conventional solid-solid classification method, e.g. by screening.

If desired, the final production stage in which the second intermediary product is heated to a temperature at which the coating material is fused, may be performed under agitation, e.g. in a vibrating bed. Such agitation may accelerate the film forming process and improve the uniformity of the resulting encapsulating coat due to strong impact interaction of the fertilizer particles. Further if desired, heating of the second intermediary product under agitation may be performed in the presence of an inert powder whose fusing point lies above the process temperature.

Amorphous waterproofing materials which do not have a distinct melting point but rather a range of transition temperatures at which the material transforms from the solid into the liquid state, were found to be most effective and convenient for use in the performance of the method according to the invention. This is due to the fact that amorphous materials are better amenable to control of the fusion process and of the degree of their fluidity, by maintaining a suitable operational temperature within the liquefication range of the waterproofing material. The possibility to use amorphous waterproofing materials for the performance of the method according to the invention is a significant departure from the prior art.

In accordance with an optional feature of the present invention, the said second intermediary product may be subjected to one or more further coating operations with the same or a different waterproofing material, prior to being subjected to the heat treatment for the fusion of the waterproofing material powder coat. When operating by this option, it may be desirable to heat the second intermediary product after each coating step to a temperature higher than the sintering temperature of the applied waterproofing material and below the fusion temperature thereof, before the application of a further layer of powderous waterproofing material.

By the application of additional coats in the manner specified, the increased thickness of the encapsulating shell obtained after fusion will prolong the release period of the fertilizer.

In accordance with a particular embodiment of the invention, the powder used for coating the first intermediary product in order to convert it into the second intermediary product, is a mixture of a waterproofing material of the kind specified and a non-soluble inert powder which has a fusing or decomposition point higher than the temperature prevailing during the process, which inert powder serves as filler and for ensuring adequate fluidity of the powderous waterproofing material. Typical inert ingredients for such a mixed powder are sand, sulfur, insoluble minerals such as talc, limestone, dolomite and the like.

If desired, it is also possible in accordance with the present invention to apply on top of the coat of powderous waterproofing material a coating of the same or a different waterproofing material, which can be done by conventional methods such as by melt spray, solution spray or by way of in situ copolymerization; and only thereafter to subject the second intermediary product obtained in this way to heat treatment for fusion of the first applied powderous waterproofing material. In accordance with this embodiment of the invention, fertilizers with a composite encapsulating coat are obtained in which the slow-release properties are determined by the combined effects of the two encapsulating layers.

From the foregoing general description it is readily seen that the invention provides a versatile encapsulation method for the production of slow-release particulate fertilizers which enables to adjust the slow-release properties according to need, and the manner of doing so can be established in each case by simple experimentation on the basis of the teachings of the present invention. The method, moreover, is environmentally friendly in that in the production of the encapsulating shell that adheres to the fertilizer substrate and which may be the only shell or an intermediary shell, as the case may be, no solvents are required.

Finally, due to the fact that the waterproofing material has to meet only the criteria of fusing at a temperature below the phase transition temperature of the fertilizer, and of being solid at the expected storage temperature, a host of cheap coating materials can be used which could not have been used for a similar purpose hitherto.

DESCRIPTION OF THE DRAWINGS

For better understanding, the invention will now be described, by way of example only, with reference to the annexed drawings in which.

Figure 1:
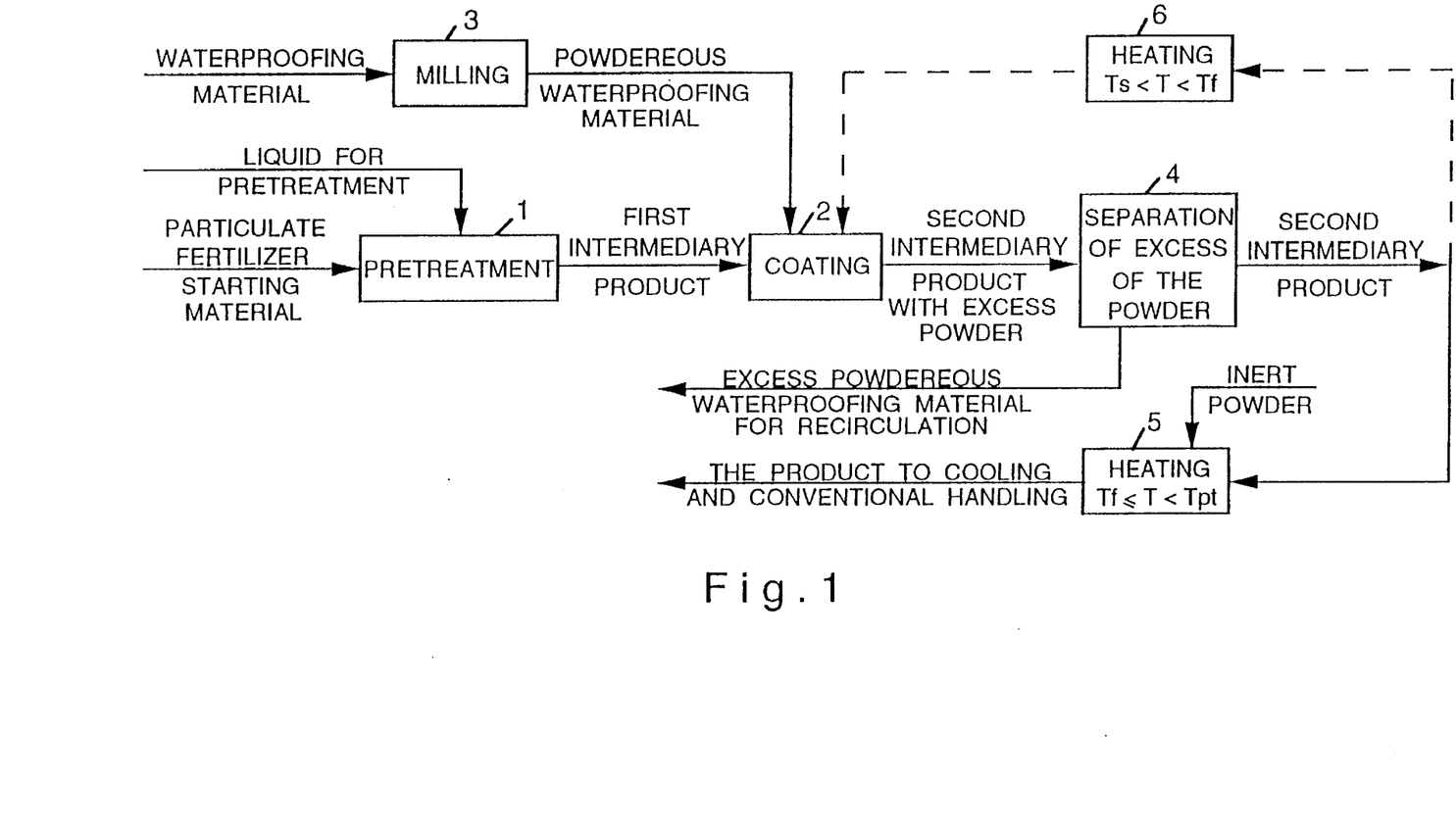
FIG. 1 is a block diagram of an embodiment of the method according to the invention in which the starting material is pretreated with a liquid.
Figure 2:
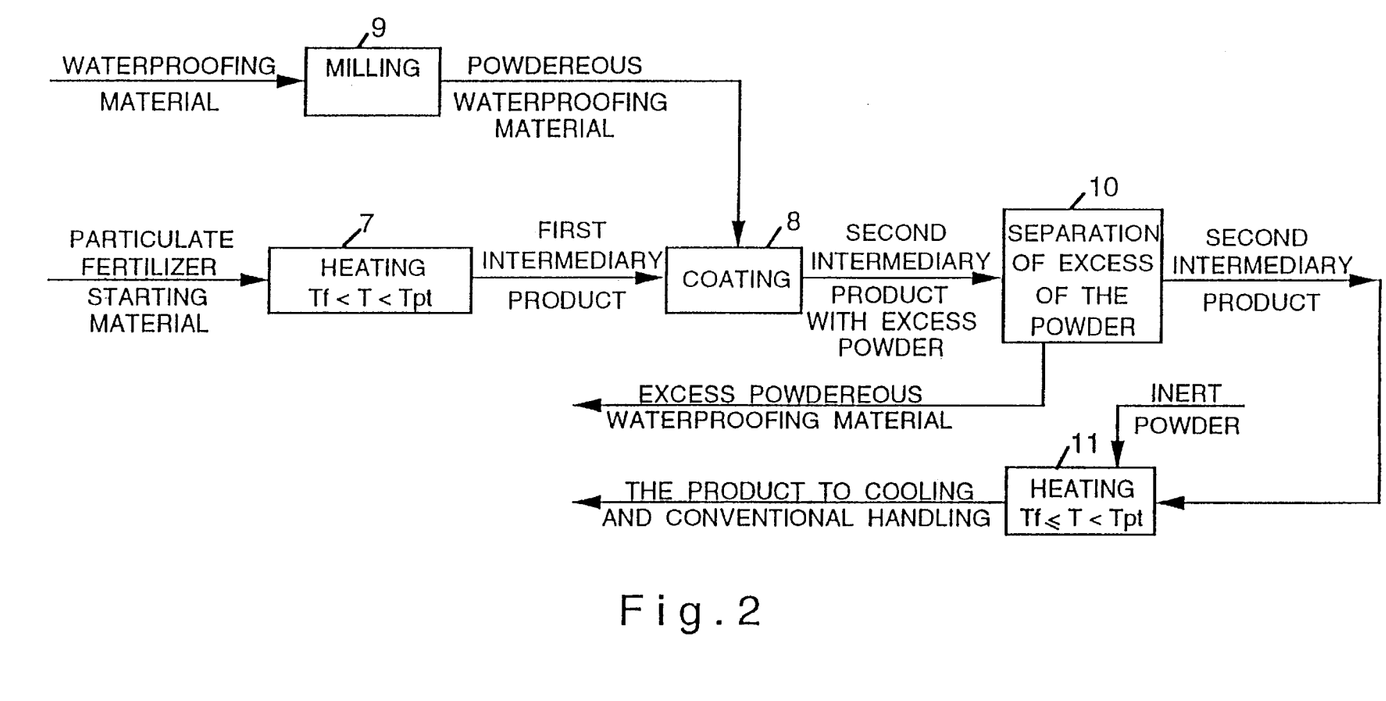
FIG. 2 is a block diagram of a second embodiment in which the pretreatment of the starting material is by way of heating.
Figure 3:
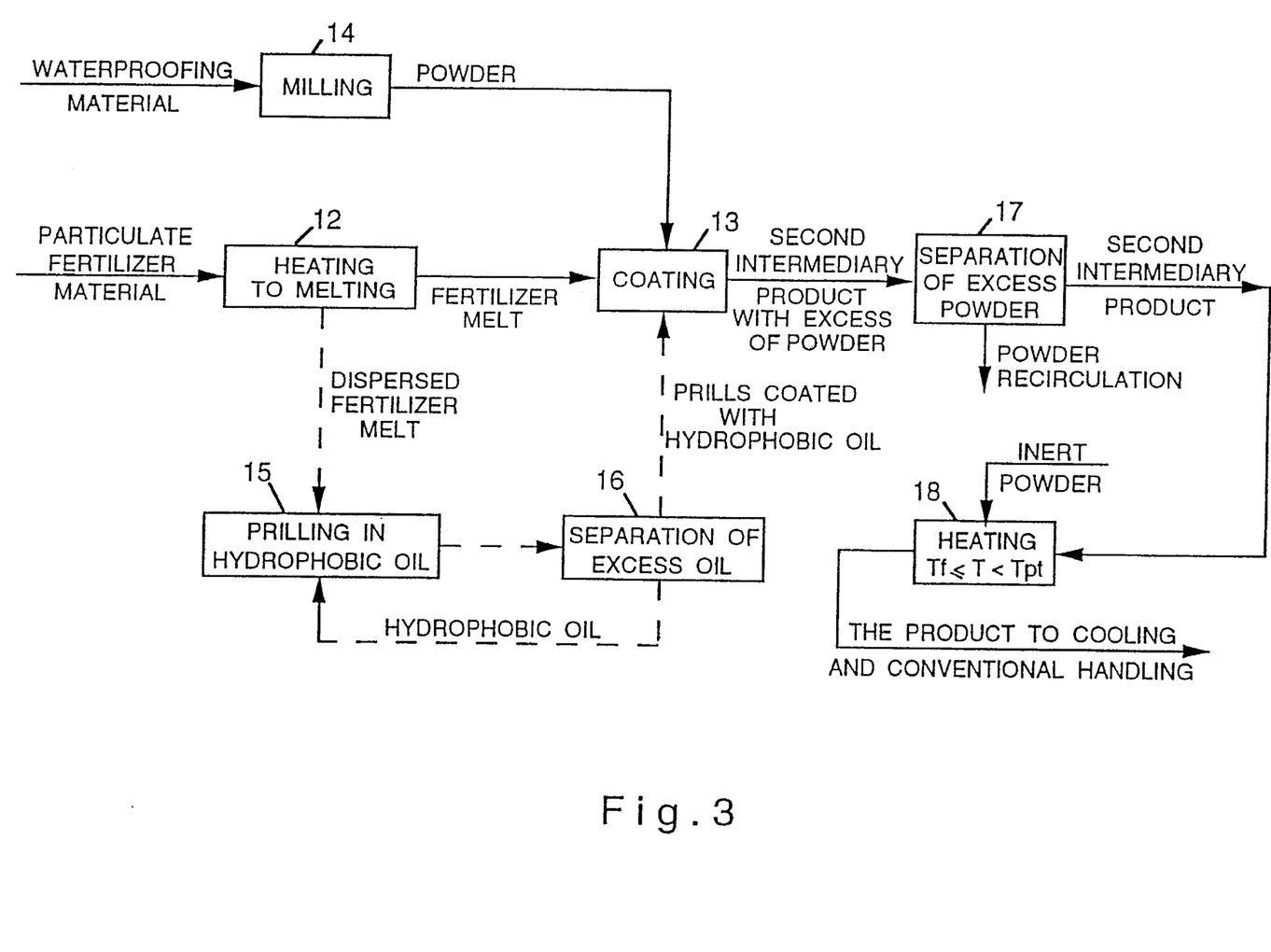
FIG. 3 is a block diagram of another embodiment in which pretreatment is by way of melting the starting material.

In all figures Tf stands for the fusion temperature of the waterproofing material, Tpt stands for the phase transition temperature of the fertilizer and T is an operational temperature. In FIG. 1 Ts stands for the sintering temperature of the coating.

Attention is first directed to FIG. 1. As shown, particulate fertilizer starting material is fed into a processing unit 1 together with liquid for pretreatment and the resulting first intermediary product is withdrawn and fed into a coating unit 2 together with powderous waterproofing material which is milled in situ in a milling unit 3, the relative amounts being so dosed that the powderous coating material inside the coating unit 2 is in excess. A mixture of second intermediary product and excess powder is withdrawn from the processing unit 2 and fed into a separator unit 4 where the excess powder is separated, e.g. by screening, and from where the second intermediary product and excess powderous waterproofing material are withdrawn separately, the latter being recycled. By one mode of operation, the second intermediary product withdrawn from separator unit 4 is fed directly into a heating unit concurrently with an inert powder, where the second intermediary product is subjected to heating at temperature T which is higher than or equal to Tf and smaller than Tpt, and the resulting product is withdrawn for cooling and further handling. The residence time inside the heating unit is so adjusted that all the waterproofing material fuses.

By another mode shown in FIG. 1 by way of dashed lines, the second intermediary product withdrawn from the separator unit 4 is recycled to the coating unit 2 via an oven 6 in which it is heated to a temperature higher than the sintering temperature but lower than the fusion temperature of the coating. In coating unit 2 another coat of powderous waterproofing material is applied, and if desired this procedure may be repeated several times. Once the desired number of coats of waterproofing material have been applied, the resulting second intermediary product is transferred from the separator unit 4 to oven 5 and is further processed in the manner specified.

Attention is now directed to FIG. 2 which shows an embodiment of the method according to the invention by which the pretreatment is by way of heating. The particulate fertilizer starting material is heated inside a heating unit 7 to a temperature T which is higher than the fusion temperature of the waterproofing material and lower than the phase transition temperature of the fertilizer. The resulting first intermediary product is introduced into a coating unit 8 together with powderous waterproofing material milled in situ in a milling unit 9, the relative proportions being again so dosed that the powder is in excess. A mixture of second intermediary product and excess powder is withdrawn from the coating unit 8 and fed into a separator unit 10 from where the separately withdrawn excess powder is recycled and the second intermediary product is fed into a heating unit 11 together with an inert powder, and it is heated there to a temperature T which is higher than or equal to the fusion temperature Tf of the water-proofing material and lower than the phase transition temperature Tpt of the fertilizer. The resulting product is withdrawn, cooled and further handled as may be required.

In the embodiment of the method according to the invention shown in FIG. 3, pretreatment is by way of melting the particulate fertilizer starting material. As shown, particulate fertilizer starting material is fed into a heating unit 12 and is discharged therefrom dropwise.

By a first variant of this embodiment, the melt drops constitute the first intermediary product, and they are fed directly into a coating unit 13 together with an excess of powderous waterproofing material milled in situ in a milling unit 14.

By a second variant shown by way of dashed lines, the fertilizer melt discharged dropwise from oven 12, is fed into a prilling unit 15 which holds a cooling liquid in form of a hydrophobic oil, and the resulting product is fed into a separator unit 15 where excess hydrophobic oil is separated and recycled. Prills coated with hydrophobic oil withdrawn from separator 16 which in this mode constitute the first intermediary product, are fed into the coating unit 13, again together with the powderous waterproofing material arriving from milling unit 14.

The second intermediary product resulting either from the first or from the second variant, is withdrawn from coating unit 13 together with excess powderous waterproofing material and fed into a separator unit 17 from where powderous waterproofing material is recycled and the separately withdrawn second intermediary product is charged into a heating unit 18 together with inert powder and is heated to a temperature T which is higher than or equal to Tf and lower than Tpt. The resulting product withdrawn from oven 18 is further processed as in the previous embodiments.

WORKING EXAMPLES

The invention will now be further illustrated by the following working examples to which it is not limited.

In all the examples the fertilizers release rate was determined on 5 g samples which were placed in 50 ml of deionized water maintained a 30° C. At predetermined time intervals the solutions were replaced by fresh deionized water and fertilizer concentration was determined in aliquots.

It was further found in accordance with the invention that the release rate is temperature dependent and that at 21° C. the release rate is about half that at 30° C.

Example 1

An amount of 50 g of urea granules having a particle size in the range of 1.6 to 3.2 mm was coated with an amorphous sulfur containing composition plasticized with a complex mixture of unsaturated organic compounds, which fuses within the range of 65°–70° C. Compositions of this kind will be referred to hereinafter as "OSBC" for Organic Sulfur Based Composition.

The above OSBC, which served as waterproofing material, was prepared as follows:

184 g of tall oil pitch (TOP) were introduced into a 1 l reactor equipped with stirrer and controlled heating means. 200 g of molten (170° C.) elemental S were added to the stirred and heated liquid as the TOP reached 190° C. and upon such addition there occurred a temperature drop down to 175° C. After 2 min. the temperature rose to 180° C. and this temperature was maintained for 30 min. when 28 g of $Ca(OH)_2$ in powder form were added and the reaction was continued for another 20 min. The product solidified upon cooling. It was milled in a coffee-grinder to a powder with a particle size in the range of between 20 to 200 μm. The sintering range of the powder was assessed to be 50°–55° C.

The urea granules were introduced into a vertical cylindrical vessel of 300 ml installed on an IKA-VIBRAX-VXR laboratory vibrator, (circular vibrations) IKA Labortechnik Company (Germany), for pretreatment with tall oil pitch which is a hydrophobic liquid. The urea granules constituted within the vibrator or vibrofluidized bed to which tall oil pitch was added in an amount of 3% by weight on the total weight of the pretreated granules. The mass was heated with hot air up to 60° C. to facilitate a uniform distribution of the liquid over the granule surfaces and to ensure sintering of the powder on the granules. The amplitude of the circular horizontal vibrations was approximately 2 mm and its frequency was between 1000–2200 rotations per minute.

After 2 minutes the pretreatment was completed and to the resulting first intermediary product in the vibrating preheated bed, 30 g of powderous OSBC were added and agitation was continued for 1 min. Thereafter, excess powder was separated from the granules by screening and the withdrawn excess quantity of powder was recycled for remilling and repeated use. The coated granules were subjected to a second coating operation by heating them in the same vibrating bed with 80° C. hot air. The procedure was similar as in the first coating and excess powder was again separated by screening and recycled.

The second intermediary product so obtained was retained in the same vibrator vessel with the frequency of vibration being 1500–2200 rotations per minute. 1 g of finely milled sulfur was added serving as inert powder to prevent caking. The vibrofluidized bed was heated to 70° C. by means of hot air. This stage together with subsequent cooling in the same vibrating bed, took approximately 10 minutes.

In the resulting encapsulated slow-release particulate fertilizer product, the OSBC based encapsulating coat amounted to 22% by weight. The fertilizer release was 4% after 1 day and 14% after 7 days.

Example 2

The procedure of Example 1 was repeated, using rosin in powder form as encapsulating material and in the final heating operation charcoal powder was used as an inert powder instead of sulfur.

In the resulting slow-release fertilizer product the encapsulating coat amounted to 19% by weight. The fertilizer release was 34% after 1 day and 82% after 7 days.

Example 3

A slow-release fertilizer was produced from 6 to 10 mm diameter urea super-granules. Solid bitumen fusing within the range of 50°–55° C. was used as waterproofing material. The bitumen was milled in a coffee-grinder after preliminary cooling in a refrigerator.

The pretreatment stage was conducted by heating the granules in a drying oven to 50° C.

The coating operation was conducted in the following manner: 20 g of the bitumen powder was placed in a 300 ml vibrating vessel of the kind used in Example 1. 50 g of the hot urea super-granules were successively dropped into a vibrofluidized bed of the coating powder. An even powder coat was formed on each granule within approximately 5–10 secs. after incorporation into the powder bed.

After the completion of the coating procedure the resulting second intermediary product was separated from the excess powder, mixed for less than 1 min. with inert graphite powder and then heated to 60° C. by hot air in the same vibrating vibrofluidized bed.

In the resulting product the encapsulating bitumen coat amounted to 13% by weight. The fertilizer release was 26% after 1 day and 50% after 30 days.

Example 4

The procedure of Example 3 was repeated, using as waterproofing material a solid wax (Kerawax 2616 of Kerax Ltd., England) which fuses within the range of 45°–50° C.

In the resulting product the encapsulating coat amounted to 24% by weight. The fertilizer release was 4.4% after 1 day and 30% after 7 days.

Example 5

The procedure of Example 1 was repeated, using for the pretreatment engine oil in an amount of 3% on the total weight of the pretreated granules, and the same OSBC as in Example 1 as waterproofing material. Powder coating was repeated five times with screening off of excess coating powder after each step.

In the resulting product the sulfur based encapsulating coat amounted to 33% by weight. The fertilizer release was 6% after 1 day, 10% after 7 days and 16% after 1 month.

Example 6

The procedure of Example 1 was repeated, using soft wax for the pretreatment operation in an amount of 3% on the total weight of the pretreated granules, using the same OSBC as in Example 1 as waterproofing material.

In the resulting product the encapsulating coat amounted to 23% by weight. The fertilizer release was 3.5% after 1 day, 11% after 7 days.

Example 7

A slow-release fertilizer was produced in a similar manner as in Example 1, the OSBC which in this case fused within the range of 50°–60° C. was prepared as in Example 1, the amount of added $Ca(OH)_2$ being, however, 16 g only. Urea granules of 4–8 mm diameter were precoated with tall oil pitch in an amount of 3% on the total weight of the precoated granules. There was only one single powder coating step and fusion of the powderous coat was effected at 60% with talc as inert additive.

In the resulting product the encapsulating coat amounted to 14% by weight. The fertilizer release was 0.7% after 1 day, 10% after 7 days and 55% after 3 months.

Example 8

An amount of 100 g of urea granules with particle size of from 1.6 to 3.2 mm were precoated in a laboratory pan of 250 mm diameter with 1.8 g of tall oil pitch to yield a first intermediary product.

Approximately 50 g of the same powderous OSBC was used as in Example 1 and the above first intermediary product was introduced into a rotating pan and the coating procedure lasted for about 2 min. Two additional coating steps were conducted, each by the addition of 50 g of powderous OSBC, and each of the additional coating steps also lasted for about 2 min. Between successive coating operations the fertilizer granules were heated by hot air to a temperature within the range of 50°–70° C. Also between successive coating steps and before the final heating operation, excess powder was separated from the granules by passing air through the rotating pan, causing elutriation of the powder particles.

The final step of fusing the OSBC powder coat was conducted in the same pan at 85° C. using talc as an inert powder.

In the resulting product the encapsulating coat amounted to 21% by weight. Fertilizer release was 4.9% after 1 day and 30% after 7 days.

Example 9

The procedure of Example 1 was repeated with the same OSBC, using 50 g of a granular monoammonium phosphate as the particulate fertilizer starting material.

In the resulting product the encapsulating coat amounted to 20% by weight. Fertilizer release was 0.3% after 1 day and 3.4% after 7 days.

Example 10

The procedure of Example 1 was repeated with the same OSBC, using 50 g of granular N-P-K fertilizer (15-15-15) as starting material.

In the resulting product the encapsulated coat amounted to 23% by weight. Fertilizer release was 8.0% after 1 day and 13% after 7 days.

Example 11

An amount of 50 g of urea granules having a particle size of 1.6 to 3.2 mm, was coated with OSBC fusing within the range of 50°–60° C. and prepared from a mixture of 132 g of crude tall oil and 48 g of rosin. The mixture was heated and reacted with 200 g of molten S for 14 min. at a temperature of 180° C. This was followed by the addition of 20 g of $Ca(OH)_2$ powder and the mixture was reacted for another 10 min. In the pretreatment stage the urea granules were heated to complete melting at a temperature 132° C. The coating material was milled to a powderous state and 30 g of the powder were placed in a 300 ml vertical cylindrical vessel, installed on a vibrator of the kind described in Example 1. The urea melt was injected through a glass capillary, whose delivery end was located directly above the surface of the vibrofluidized powder bed.

The urea melt was injected dropwise into the vibrofluidized powder bed at a rate of approximately 2 drops per second. The drops of urea melt immediately solidified into 2–4 mm prills, coated with a continuous layer of fused coating material and a superimposed outer porous powderous coat.

Excess powderous OSBC was screened off and 10 g of coated urea prills were mixed with 0.5 g of talc and thereafter subjected to final heating at 60° C. in a vibrating bed of the kind described in previous Examples.

In the resulting product the encapsulating coat amounted to 45% by weight of the final product. Fertilizer release was 1.8% after 1 day and 2.5% after 7 days.

Example 12

The materials were as in Example 1 and pretreatment was as in Example 11. The urea melt was dropped with the help of a glass capillary at a rate of approximately 2 drops per second into a 500 ml laboratory cylinder filled with soybean oil maintained at a temperature of 25° C.

The drops of urea melt immediately solidified in the oil in form of 2–4 mm prills. After prilling of approximately 30 g of urea the content of the cylinder was poured out onto 1 mm mesh screen whereby excess of soybean oil was separated from the prills which retained about 4% by weight of oil. The so separated prills were subjected to five successive steps of powderous OSBC coating in the manner described in Example 1.

Final heating was also conducted as in Example 1 using graphite as inert powder.

In the resulting product the encapsulating coat amounted to 45% by weight. Fertilizer release was 1.8% after 1 day and 3.0% after 7 days.

We claim:

1. A method of preparing an encapsulated slow-release particulate fertilizer by encapsulation of a particulate fertilizer starting material in a coherent shell of a waterproofing material comprising:

subjecting the particulate fertilizer starting material to a pretreatment to enhance its capacity of holding powderous material by adhesion, to yield a first intermediary product;

coating said first intermediary product with a powderous waterproofing material without the use of organic solvent, said powderous waterproofing material being of a kind that fuses at a temperature below the phase transition temperature of the fertilizer to yield a second intermediary product in which fertilizer particles bear a coat of powderous waterproofing material;

heating said second intermediary product to a temperature below the phase transition temperature of the fertilizer, at which the waterproofing material fuses and then allowing the particulate fertilizer to cool;

whereby a final slow release encapsulated particulate fertilizer product is obtained in which the fertilizer particles are encapsulated within a coherent shell of waterproofing material.

2. The method of claim 1, wherein the powderous waterproofing material is ready made.

3. The method of claim 1, wherein the powderous waterproofing material is milled in situ.

4. The method of claim 1, wherein said pretreatment comprises treating said particulate fertilizer starting material with a liquid wetting agent effective to adhere said powderous waterproofing material to said particulate fertilizer starting material.

5. The method of claim 4, wherein said liquid wetting agent is hydrophobic.

6. The method of claim 4, wherein said liquid wetting agent is capable of dissolving said powderous waterproofing material.

7. The method of claim 4, wherein said first intermediary product is heated prior to coating with said powderous waterproofing material to a temperature below the fusion temperature of the powderous waterproofing material.

8. The method of claim 1, wherein said pretreatment comprises heating said particulate fertilizer starting material to above the fusion temperature of the waterproofing material.

9. The method of claim 1, wherein said pretreatment comprises melting said particulate fertilizer starting material and dispersing the resulting melt into drops.

10. The method of claim 9, wherein the dispersed melt of said particulate fertilizer starting material is fed directly into an agitated bed of said powderous waterproofing material.

11. The method of claim 9, wherein the dispersed melt of said particulate fertilizer starting material is prilled in a cooling liquid before coating with said powderous waterproofing material.

12. The method of claim 11, wherein said cooling liquid is hydrophobic.

13. The method of claim 1, wherein an excess of powderous waterproofing material is used for coating said first intermediary product.

14. The method of claim 1, wherein coating of said first intermediary product is effected by vitro-fluidization.

15. The method of claim 1, wherein heating of said second intermediary product is performed under agitation.

16. The method of claim 15 wherein agitation is by way of vitro-fluidization.

17. The method of claim 1, wherein said first intermediary product is subjected to at least two successive powder coating steps, any excessive powderous waterproofing material being removed after each step.

18. The method of claim 17, wherein the same powderous water-proofing material is used in all steps.

19. The method of claim 17, wherein different powderous water-proofing materials are used.

20. The method of claim 17, wherein the second intermediary product is heated after each coating step to a temperature higher than the sintering temperature of the waterproofing material and lower than the fusion temperature thereof.

21. The method of claim 1, wherein said second intermediary product is subjected to a conventional encapsulation operation prior to heating for fusion of said coat of powderous waterproofing material.

22. The method of claim 1, wherein said waterproofing material is a sulfur based composition.

* * * * *